United States Patent [19]

Skibo

[11] 4,040,198
[45] Aug. 9, 1977

[54] BAIT CASTING DEVICE

[76] Inventor: Phillip M. Skibo, 1353 Thomas St., Green Bay, Wis. 54303

[21] Appl. No.: 682,613

[22] Filed: May 3, 1976

[51] Int. Cl.² ............................................. A01K 91/02
[52] U.S. Cl. ....................................................... 43/19
[58] Field of Search ................... 43/19, 6; 124/16, 17, 124/21

[56] References Cited

U.S. PATENT DOCUMENTS

| 2,569,604 | 10/1951 | Hall | 43/19 |
| 2,645,218 | 7/1953 | Fisher | 43/19 |
| 2,849,824 | 9/1958 | McGee | 43/19 |

FOREIGN PATENT DOCUMENTS

| 1,139,086 | 2/1957 | France | 43/19 |
| 1,027,766 | 2/1953 | France | 43/19 |
| 487,468 | 12/1953 | Italy | 43/19 |

Primary Examiner—Warner H. Camp
Attorney, Agent, or Firm—Brezina & Lund

[57] ABSTRACT

A portable device usable with a fishing rod for selectively projecting or casting a fish lure outwardly to desired areas by means of stretching or retracting a flexible elastic or stretchable line or a stretchable spring, which is mounted on and connected to a fishing rod or pole, and which has a movable, slidable carrier or open ended slidably mounted container, which is connected to an end part of the elastic or spring, and which is adapted to be pulled back or stretched, and then released to cause the carrier or receptacle to snap forward to thereby project a lure from within the receptacle into areas in which the user desires the lure to fall.

3 Claims, 4 Drawing Figures

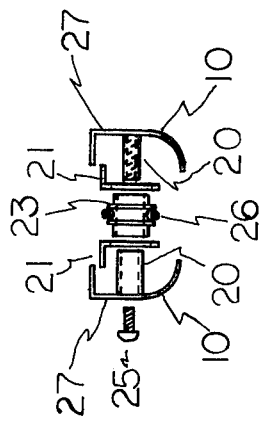
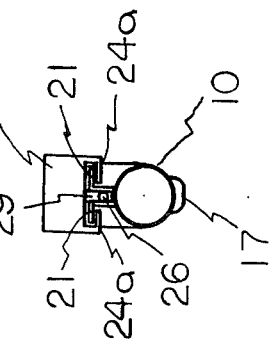
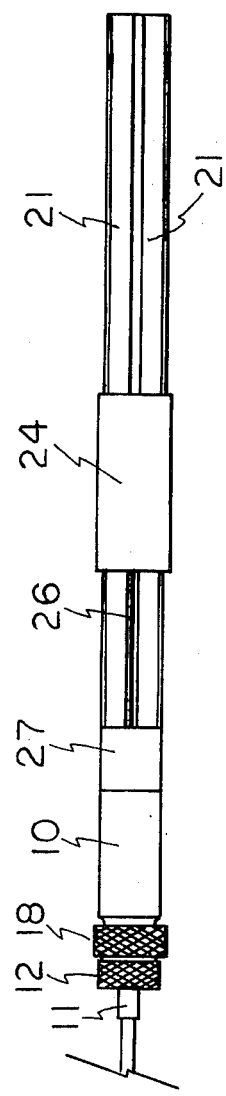
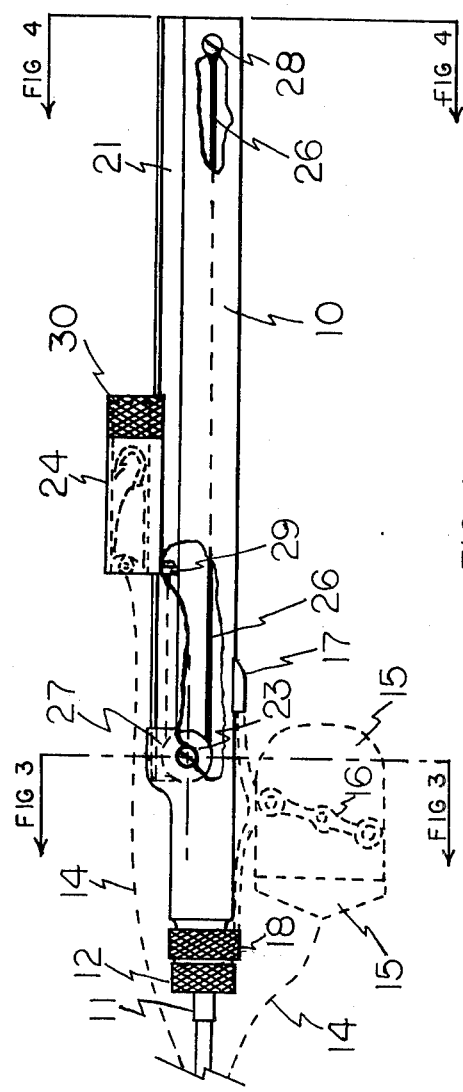
U.S. Patent    Aug. 9, 1977    4,040,198

BAIT CASTING DEVICE

SUMMARY

A fishing rod and device for selectively projecting a fish lure which includes a rod and a handle adapted to have a line reel mounted on same, and having a slidable retractable member for releasably mounting a separate rigid lure, and a guide track element along which said member is slidable, and a movable elastic member for quickly moving said retractable member forwardly in a forward direction to project said lure in an outward direction, said lure and connected line being selectively retrievable.

Disclosure of prior art disclosed in a preliminary search and known to applicant is as follows:

J. O. Malott, U.S. Pat. No. 2,823,483, dated Feb. 18, 1958

W. J. Duperron, U.S. Pat. No. 3,468,051, dated Sept. 23, 1969

Raymond G. Zenick, U.S. Pat. No. 3,641,695, dated Feb. 15, 1972

S. A. Minerva, U.S. Pat. No. 3,305,963, dated Feb. 28, 1967

BRIEF DESCRIPTION OF THE DRAWINGS

FIG. 1 is a solid side elevation view of my casting device with parts shown in dotted lines, and showing the casting rod broken away, and showing the main part of the device.

FIG. 2 is an elevation looking at the top of my bait or lure casting device, with a part of the casting rod broken away.

FIG. 3 is a cross-sectional view on a vertical plane indicated as 3—3 on FIG. 1.

FIG. 4 is a cross-sectional view on a vertical plane indicated as 4—4 on FIG. 1.

Numeral 10 designates a rigid grippable handle having an adjustable clamp 12 releasably gripping an end of a metal or plastic rod 11 which carries the usual spaced apart guide eyelets (not shown) thereon through which the flexible fish line is threaded.

The forward portion of the line 14 is suitably wound about the spool of a manually operable fishing reel 15 which has a hand crank 16 illustrated in dotted lines.

The reel 15 has the end portions of its metal holding bracket releasably secured between the recessed lug 17 and the annular flange of a rotatable holding collar 18 which is suitably threaded on the forward portion of the handle 10.

The handle 10 has an intermediate portion to which are suitably secured two elongated metal tracks 21 of angular cross section, whose normally lower edges of flanges 22 are curved inward, as shown in FIG. 3, and the normally upper edges are angularly bent to merge into shoulder 27.

The pair of metal guide tracks 21 are secured by means of the inwardly extending passaged sleeves or hubs 20 which extend inwardly, and a means such as screw 25 extends through said hubs 20 and threads into one of said hubs 20, which said hub is internally threaded, as illustrated in FIG. 3, to thereby aid in securing the guide tracks 21 in parallel position on said handle 10.

As shown in FIG. 4, an open ended receptacle, container or carrier 24, which is open at its forward end, has integral inwardly extending flanges 24a which are mounted slidably along the integral flanges of the tracks 21 respectively. The inside flange of said metal tracks 21 are spaced apart to provide a space in which a part of the flexible band 26 is movable.

The threaded bolt of screw 25 is mounted through said passaged sleeves or hubs 20 and through the hub of a grooved pulley 23. Said screw 25 is secured to hold said tracks 21 in position, and secures same against the side portion of the handle of the rod and holds the nipples adjacent each other, which provides for journalling of the rotatable pulley 23.

As shown in FIG. 4, which is an end view looking at the right hand end portion of FIG. 2, the handle 10 shows the elongated parallel tracks 21 secured thereon.

The open ended receptacle or carrier 24 for the lure has integral inwardly inwardly inwardly extending flanges 24a which aid in slidably mounting said carrier of receptacle 24 relative and along the tracks for slidable movement.

The intermediate part of the handle has a projecting integral shoulder 27 adjacent the end of the tracks which acts as a stop member for the forward movement of the receptacle or bait carrier 24. These tracks or strips provide a tunnel in which a receptacle or container 24 is adapted to freely slide between the projecting shoulder 27 and the rear end portion of the handle 10.

An elastic or stretchable flexible band 26 has one end thereof secured on a cross pin 28 in the handle, and it extends about and rides on the grooved pulley 23, and extends rearwardly where it is connected to an edge hook or projection 29 on the end portion of a movable container or carrier 24, which said carrier is freely slidable between and along the tracks 21. This band 26 may optionally be an elongated flexible spring with hooked ends. Said open ended container or carrier 24 has a knurled grippable rear end portion 30. to facilitate manual gripping and retraction of said container.

Said carrier or open ended container 24 is adapted to have a fish lure, with hooks thereon, placed loosely into it, and it is selectively and manually pulled back against the action of the elastic band or spring 26. The person using same will release said container or carrier 24, and it and the lure within it will be allowed to snap forward and outwardly in the direction the user has pointed the fishing pole, and upwardly to the extent desired, so as to cause the lure, with connected hooks, and the connected portion of the line to be thrown out of the receptacle or carrier to then drop by gravity into the area of the water body desired.

After fishing with the projectable lure, to which the line is connected, the user can easily manually wind up the line on the reel to the desired extent, and after winding up the line, he can then replace the lure with hooks into the receptacle, container or carrier and pull the carrier 24 back against the action of the elastic band, or spring, after which he is ready to again project the lure in the desired direction.

If the user has caught a fish on the lure and its hook, or desires to change the bait, he can easily wind up the line on the reel and remove the fish or lure, and then repeat the same steps to project the lure as recited to the desired area.

My above described bait and lure casting device provides a satisfactory bait or lure caster which provides for easily and selectively removably mounting of the bait or lure in a slidably mounted separate container or carrier, which permits a user to swing a rod or pole to selectively cast the releasable bait or lure to the desired areas where the user desires to fish. The flexible line to which the lure is attached may be easily retrieved and wound on the spool of a manually operable fishing reel by activating the crank thereof as desired.

While the foregoing specification sets forth the invention in specific terms, it is to be understood that numerous changes in the materials may be resorted to without departing from the spirit and scope of the invention as claimed hereinafter, and it is contemplated that various changes may be made in the embodiment of the invention herein specifically described without departing from or sacrificing any of the advantages of the invention or any features thereof.

I claim:

1. In a bait casting device including a handle adapted to support a rod from a forward end thereof and adapted to support a reel for forward feeding of a fishing line therefrom and for retraction of the fishing line, said handle member including a pair of elongated side wall members together defining a hollow generally tubular structure having a central longitudinal axis, a pair of elongated track members on an upper side of said handle and having a first pair of portions in parallel vertical planes on opposite sides of a central vertical plane through said longitudinal axis and having a second pair of portions in a horizontal plane transverse to said central vertical plane and projecting in opposite directions from said central vertical plane, a bait carrier mounted on said track members for longitudinal slidable movement therealong and including inwardly extending flanges for cooperation with said second pair of portions of said track members to retain said carrier on said track members during slidable movement therealong, means for securing said pair of side wall members of said handle together and for securing said track members thereto including fastening means extending transversely between said side wall members of said handle and through forward end portions of said track members, a pulley journalled on said fastening means for rotation about a horizontal axis in a plane transverse to said central vertical plane, and flexible band means secured at one end to said bait carrier and at an opposite end to the rearward end of said handle, said flexible band means being entrained on said pulley and having an upper portion extending between said first pair of portions of said track members and between said pulley and said bait carrier and having a lower portion extending rearwardly within said handle between said pulley and said rearward end of said handle.

2. In a bait casting device as defined in claim 1, said fastening means comprising a sleeve extending from one of said side wall members of said handle toward the other and defining a bearing surface for said pulley.

3. In a bait casting device as defined in claim 2, said fastening means further comprising a hub extending from said other of said side wall members of said handle and with said sleeve and a screw threaded into said hub.

* * * * *